United States Patent
Dai et al.

(10) Patent No.: US 12,088,022 B2
(45) Date of Patent: Sep. 10, 2024

(54) NEAR FIELD COMMUNICATION ANTENNA STRUCTURE, HOUSING WITH THE SAME, AND ELECTRONIC TERMINAL

(71) Applicant: SAMSUNG ELECTRONICS CO., LTD., Gyeonggi-do (KR)

(72) Inventors: Xin Dai, Guangdong (CN); Yong Li, Guangdong (CN); Jingwen Zhu, Guangdong (CN)

(73) Assignee: Samsung Electronics Co., Ltd (KR)

(*) Notice: Subject to any disclaimer, the term of this patent is extended or adjusted under 35 U.S.C. 154(b) by 398 days.

(21) Appl. No.: 17/292,172

(22) PCT Filed: Nov. 9, 2018

(86) PCT No.: PCT/KR2018/013635
§ 371 (c)(1),
(2) Date: May 7, 2021

(87) PCT Pub. No.: WO2020/096094
PCT Pub. Date: May 14, 2020

(65) Prior Publication Data
US 2021/0399421 A1    Dec. 23, 2021

(51) Int. Cl.
*H01Q 7/00* (2006.01)
*H04B 5/24* (2024.01)
*H04B 5/77* (2024.01)

(52) U.S. Cl.
CPC ............ *H01Q 7/00* (2013.01); *H04B 5/24* (2024.01); *H04B 5/77* (2024.01)

(58) Field of Classification Search
CPC ....... H01Q 7/00; H04B 5/0056; H04B 5/0075
See application file for complete search history.

(56) References Cited

U.S. PATENT DOCUMENTS 10,347,966 B2 *  7/2019  Lee ...................... H01Q 1/2283
10,461,793 B2 * 10/2019  Lee ......................... H01Q 13/10
(Continued)

FOREIGN PATENT DOCUMENTS

| CN | 107293856 A | * 10/2017 | ........... H01Q 1/2225 |
|----|-------------|-----------|------------------------|
| CN | 206673114   | 11/2017   |                        |
| WO | WO2018-129877 | 7/2018 |                        |

OTHER PUBLICATIONS

Machine Translation of CN107293856A (Year: 2017).*
(Continued)

*Primary Examiner* — Raymond R Chai
(74) *Attorney, Agent, or Firm* — The Farrell Law Firm, P.C.

(57) ABSTRACT

The present application provides a near field communication antenna structure, a housing with the same, and an electronic terminal, the near field communication antenna structure including a first conductive body, a second conductive body, a micro-slit structure, a first feed point and a second feed point, wherein the micro-slit structure is positioned between the first conductive body and the second conductive body to separate the first conductive body from the second conductive body, the first feed point is provided on the first conductive body, and the second feed point is provided on the second conductive body. The use of the above NFC antenna structure saves a separate NFC antenna structure, reduces cost and has a simple structure.

18 Claims, 3 Drawing Sheets

(56) References Cited

U.S. PATENT DOCUMENTS

| | | | |
|---|---|---|---|
| 10,916,834 B2* | 2/2021 | Lyu | H01Q 1/243 |
| 10,950,941 B2* | 3/2021 | Lilja | H01Q 1/243 |
| 2010/0277383 A1 | 11/2010 | Autti et al. | |
| 2015/0222009 A1* | 8/2015 | Asou | H01Q 1/243 |
| | | | 343/702 |
| 2017/0012343 A1* | 1/2017 | Wang | H01Q 1/243 |
| 2018/0151943 A1 | 5/2018 | Lee et al. | |
| 2018/0219276 A1 | 8/2018 | Han et al. | |
| 2018/0342798 A1* | 11/2018 | Lin | H04B 5/00 |
| 2019/0326659 A1* | 10/2019 | Lyu | H01Q 13/16 |
| 2019/0372201 A1 | 12/2019 | Zhu et al. | |
| 2023/0223693 A1* | 7/2023 | Lee | H04B 5/79 |
| | | | 343/728 |

OTHER PUBLICATIONS

PCT/ISA/210 Search Report issued on PCT/KR2018/013635, Aug. 8, 2019, pp. 3.

PCT/ISA/237 Written Opinion issued on PCT/KR2019/013635, Aug. 8, 2019, pp. 5.

\* cited by examiner

NEAR FIELD COMMUNICATION ANTENNA STRUCTURE, HOUSING WITH THE SAME, AND ELECTRONIC TERMINAL

PRIORITY

This application is a National Phase Entry of International Application No. PCT/KR2018/013635, which was filed on Nov. 9, 2018, the content of which is incorporated herein by reference.

TECHNICAL FIELD

The present application relates to an antenna structure, and more particularly, relates to a near field communication (NFC) antenna structure, a housing with the same, and an electronic terminal.

BACKGROUND ART

With continuous development of an electronic communication technology, electronic terminals have richer functions, and antennas supporting the electronic terminals to implement various data transmission and communication functions also become more and more. A near field communication antenna is an antenna structure implementing Near-Field Communications (NFC).

At present, a commonly used manner of mounting a NFC antenna inside an electronic terminal is to attach the NFC antenna along with a ferrite thereof to a housing of the electronic terminal. For an electronic terminal with a metal housing, the following setting manner is generally adopted:

I. A scheme of a vertical slit 1+a NFC coil antenna 2 is adopted between the metal housing, that is, a vertical slit is provided below a gap 3 of the metal housing, and the NFC coil antenna 2 is attached to the part of the vertical slit 1, so that a NFC signal is radiated out via the vertical slit 1 (as shown in FIG. 1).

DISCLOSURE OF INVENTION

Technical Problem

However, the above setting manner has the following defects:
1. the providing of a vertical slit on the metal housing affects appearance;
2. the use of a custom coil antenna causes a high material cost; and
3. if the NFC coil antenna is mounted on the metal housing, when mounting the NFC coil antenna, an accuracy is not easily controlled, a NFC frequency is easily caused to offset, and a NFC performance is affected.

II. The NFC coil antenna 2 is moved up to the original gap 3 of the metal housing, and the NFC signal is radiated out via the gap 3 (as shown in FIG. 2). Although such the setting manner may unnecessarily provide a vertical slit on the metal housing, a coupling may be formed between the NFC coil antenna and a main antenna, thereby affecting performance of the main antenna.

Solution to Problem

The purposes of the present application lie in proposing a near field communication antenna structure, a housing with the same, and an electronic terminal without providing a NFC antenna coil additionally, and being able to avoid a mutual coupling effect between a NFC signal and a main signal effectively.

One aspect of exemplary embodiments of the present application is to provide a near field communication (NFC) antenna structure. The NFC antenna structure includes a first conductive body, a second conductive body, a micro-slit structure, a first feed point and a second feed point, wherein the micro-slit structure is positioned between the first conductive body and the second conductive body to separate the first conductive body from the second conductive body, the first feed point is provided on the first conductive body, and the second feed point is provided on the second conductive body.

Alternately, the NFC antenna structure may further include a conductive connection structure, and the conductive connection structure may bridge the first conductive body, the micro-slit structure and the second conductive body in a direction of the first conductive body opposite to the second conductive body.

Alternately, the first feed point may be arranged at a position close to the micro-slit structure and far away from the conductive connection structure on the first conductive body, and the second feed point may be arranged at a position close to the micro-slit structure and far away from the conductive connection structure on the second conductive body.

Alternately, the first conductive body may be connected to a NFC circuit module via the first feed point, and the second conductive body may be connected to the NFC circuit module via the second feed point.

Alternately, the first feed point and the second feed point may be shared by the NFC circuit module and a main signal circuit module.

Alternately, the NFC antenna structure may further include a first low pass filter and a second low pass filter, wherein one end of the first low pass filter is connected to the first feed point and the other end of the first low pass filter is connected to the NFC circuit module, and one end of the second low pass filter is connected to the second feed point and the other end of the second low pass filter is connected to the NFC circuit module.

Alternately, the NFC antenna structure may further include a first high pass filter and a second high pass filter, wherein one end of the first high pass filter is connected to the first feed point and the other end of the first high pass filter is connected to the main signal circuit module, and one end of the second high pass filter is connected to the second feed point and the other end of the second high pass filter is connected to the main signal circuit module.

Alternately, the first conductive body, the micro-slit structure, and the second conductive body may form a housing of the electronic terminal.

Alternately, the NFC circuit module and the main signal circuit module may be provided on a main board of the electronic terminal.

Alternately, the micro-slit structure may include at least one conductive layer and at least one non-conductive layer laminated each other in a direction of the first conductive body opposite to the second conductive body.

Another aspect of exemplary embodiments of the present application is to provide a housing, which is characterized in that the housing includes the above NFC antenna structure.

Yet another aspect of exemplary embodiments of the present application is to provide an electronic terminal, which is characterized in that the electronic terminal includes the above housing.

Advantageous Effects of Invention

The NFC antenna structure, the housing with the same, and the electronic terminal according to the exemplary embodiments of the present application save a separate NFC antenna structure, reduce cost and have a simple structure.

BRIEF DESCRIPTION OF DRAWINGS

The above and other purposes, characteristics and advantages of the present application will become clearer by the following detailed depiction made in conjunction with the drawings, wherein.

MODE FOR THE INVENTION

The embodiments of the present application will be described in detail with reference to the drawings below.

Figure 1:
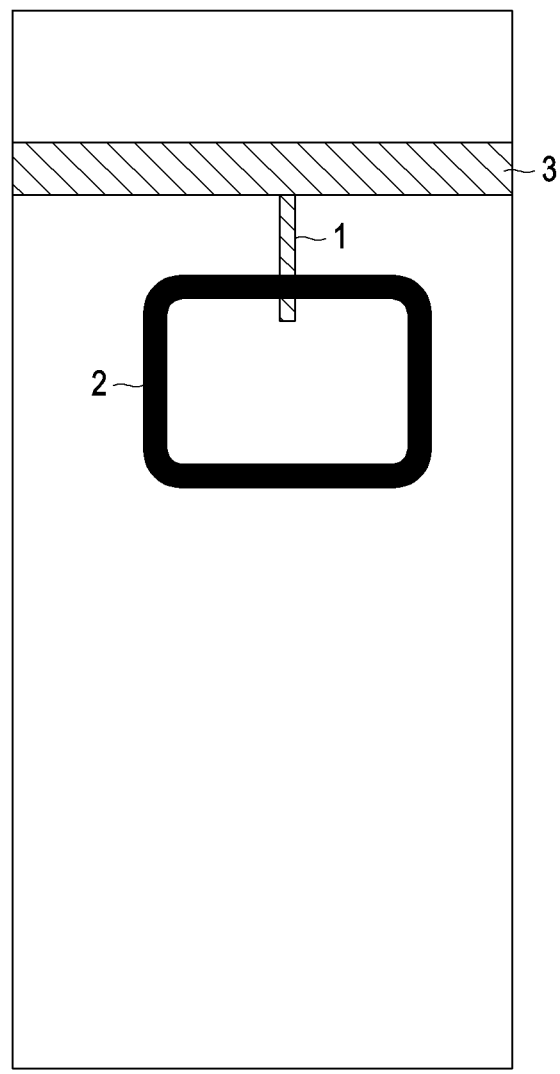
FIG. 1 is a first exemplary diagram illustrating an existing NFC antenna structure.
Figure 2:
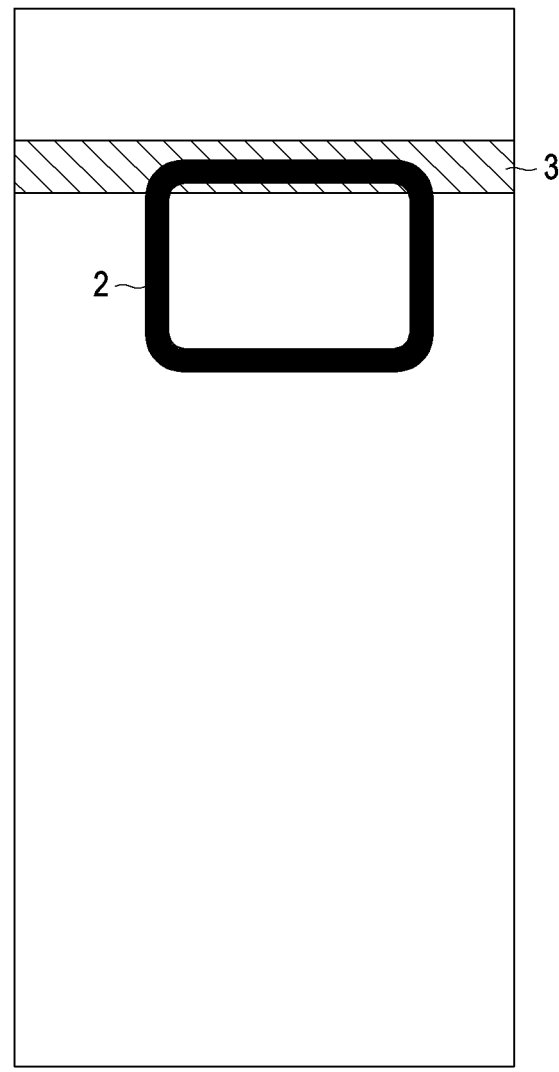
FIG. 2 is a second exemplary diagram illustrating an existing NFC antenna structure.
Figure 3:
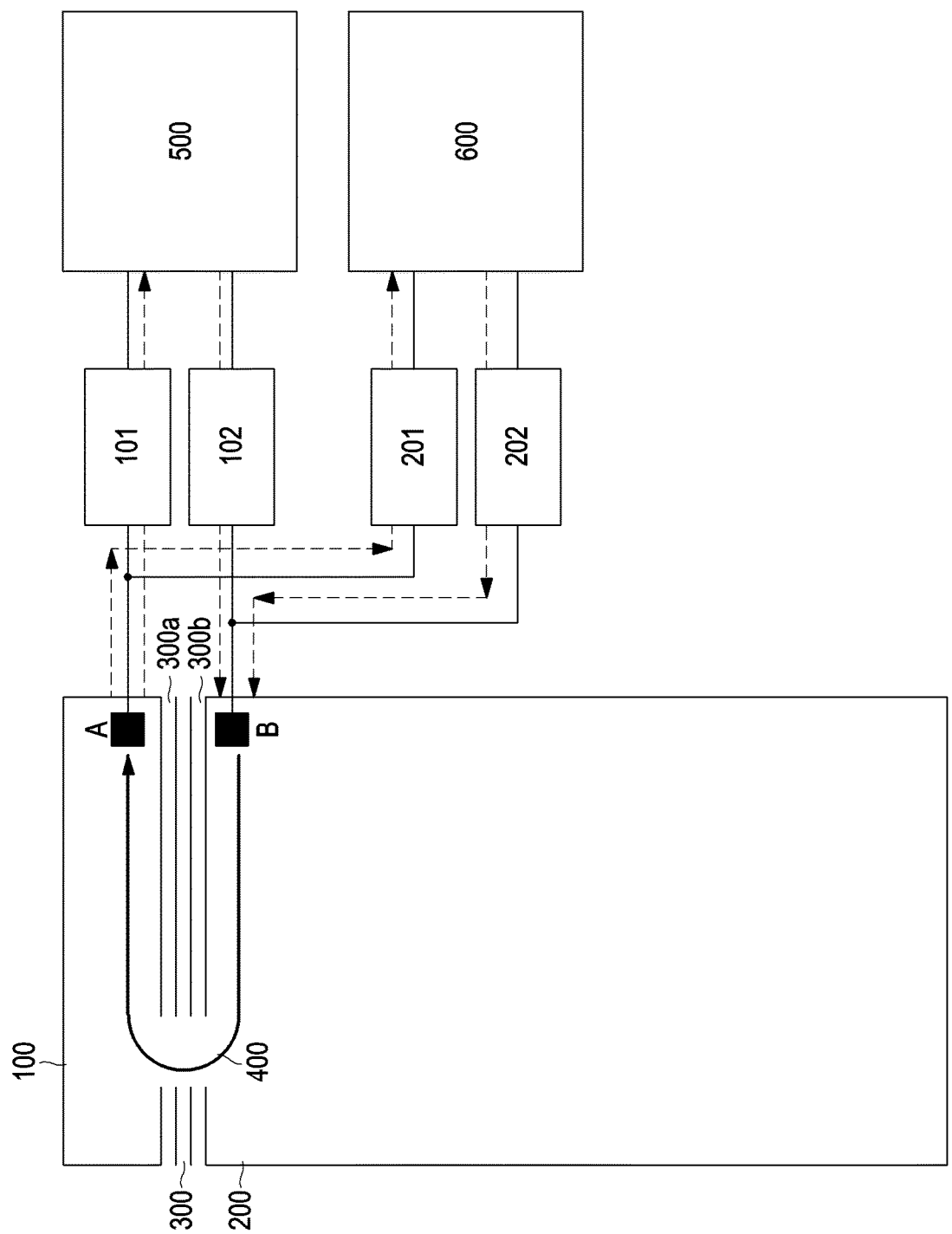
FIG. 3 is a schematic diagram illustrating a NFC antenna structure according to an exemplary embodiment of the present application.

FIG. 3 is a schematic diagram illustrating a NFC antenna structure according to an exemplary embodiment of the present application.

As shown in FIG. 3, the NFC antenna structure according to the exemplary embodiment of the present application includes a first conductive body 100, a second conductive body 200, a micro-slit structure 300, a conductive connection structure 400, a first feed point A and a second feed point B. A composition and a working principle of the antenna structure of the present application are introduced with reference to FIG. 3 below.

Particularly, one of the first conductive body 100 and the second conductive body 200 may constitute a radiating element of the NFC antenna structure, and the other one of the first conductive body 100 and the second conductive body 200 may constitute a grounding element of the NFC antenna structure. In the exemplary embodiments of the present application, the introduction is made by exemplifying the first conductive body 100 as the radiating element and the second conductive body 200 as the grounding element.

As an example, the first conductive body 100 and the second conductive body 200 may be made of the same conductive material, and preferably, the conductive material may include a metal.

The micro-slit structure 300 is positioned between the first conductive body 100 and the second conductive body 200 to separate the first conductive body 100 from the second conductive body 200. The micro-slit structure 300 may include at least one conductive layer 300a and at least one non-conductive layer 300b laminated each other in a direction of the first conductive body 100 opposite to the second conductive body 200. Herein, the direction of the first conductive body 100 opposite to the second conductive body 200 may refer to a direction from the first conductive body 100 to the second conductive body 200 or a direction from the second conductive body 200 to the first conductive body 100. In other words, the at least one conductive layer 300a and the at least one non-conductive layer 300b included in the micro-slit structure 300 may be arranged alternatively along the direction from the first conductive body 100 to the second conductive body 200 (or the direction from the second conductive body 200 to the first conductive body 100).

Preferably, a thickness of each of the conductive layers 300a may be the same, and preferably, a thickness of each of the non-conductive layers may be 0.03 mm to 0.15 mm. The thickness of each of the non-conductive layers 300b may be the same. The thickness of the conductive layers 300a and the thickness of the non-conductive layers 300b may be the same or may be different. Herein, the thickness may refer to a length of one conductive layer 300a or one non-conductive layer 300b along the direction from the first conductive body 100 to the second conductive body 200.

Preferably, a manufacturing material of the conductive layer 300a in the micro-slit structure 300 may be the same as that of the first conductive body 100 and the second conductive body 200, and may be made of metal, for example. As an example, the non-conductive layer 300b may include plastic.

As an example, when the micro-slit structure 300 includes one conductive layer 300a and one non-conductive layer 300b, corresponding to the first conductive body 100 and the second conductive body 200 being separated by a gap (the non-conductive layer 300b), at this time, the thickness of the non-conductive layer 300b may be increased appropriately according to actual situations, so that the NFC signal can be radiated out via the gap.

The conductive connection structure 400 bridges the first conductive body 100, the micro-slit structure 300 and the second conductive body 200 in the direction of the first conductive body 100 opposite to the second conductive body 200. That is to say, the first conductive body 100 is connected to the second conductive body 200 by the conductive connection structure 400, and the conductive connection structure 400 is further connected to the at least one conductive layer 300a in the micro-slit structure 300.

In one example, the conductive connection structure 400 may be positioned on an inner side surface of the micro-slit structure 300.

Particularly, the micro-slit structure 300 may include two surfaces (that is, an inner side surface and an outer side surface) provided opposite to each other. As an example, the outer side surface may refer to a side exposed outside, that is, a surface that a user can touch directly, and the inner side surface may refer to a side that the user cannot touch directly. In this example, the conductive connection structure 400 may be protruded on the inner side surface of the micro-slit structure 300. For example, the conductive connection structure 400 may be manufactured on the inner side surface of the micro-slit structure 300 using the existing various manufacturing methods.

In another example, the conductive connection structure 400 may be positioned at a bottom portion of the micro-slit structure 300.

Particularly, the outer side surface (a side that the user touches) of the micro-slit structure 300 may be defined as an upper portion of the micro-slit structure 300, and the inner side surface (a side that the user cannot touch) of the micro-slit structure 300 may be defined as the bottom portion of the micro-slit structure 300. In this example, the conductive connection structure 400 being positioned at the bottom portion of the micro-slit structure 300 may refer to the conductive connection structure 400 being arranged on the inner side surface of the micro-slit structure 300 without being protruded from the inner side surface.

Herein, a length of the conductive connection structure 400 in the direction from the first conductive body 100 to the second conductive body 200 (that is, a longitudinal direction) is greater than that of the micro-slit structure 300 in the longitudinal direction. Preferably, the conductive connection structure 400 may have the same manufacturing material as that of the first conductive body 100.

Alternately, the first conductive body 100 in the above NFC antenna structure may generally be disposed to be wider (that is, the length along the direction from the first conductive body 100 to the second conductive body 200 is greater). Herein, the first conductive body 100 is used as the radiating element and the NFC signal is radiated out via the radiating element. If the first conductive body 100 is wider, most of a current of a NFC signal may be distributed evenly on the first conductive body 100 when the current of a NFC signal is guided into the first conductive body 100, that is, the first conductive body 100 corresponds to the ground, the changed current is too little to form resonance, and the current cannot be converted into an electromagnetic wave and cannot be radiated out.

The first conductive body 100 is connected to the second conductive body 200 by the conductive connection structure 400. In order to extend a path of the changed current as far as possible to enhance radiation of the NFC antenna, it can be selected that the first feed point A and the second feed point B are disposed on the first conductive body 100 and the second conductive body 200, respectively.

Preferably, the first feed point A may be arranged at a position close to the micro-slit structure 300 and far away from the conductive connection structure 400 on the first conductive body 100, and the second feed point B may be arranged at a position close to the micro-slit structure 300 and far away from the conductive connection structure 400 on the second conductive body 200, so as to form a longer current path as far as possible to enhance the radiation of the antenna. However, the present utility model is not limited thereto. The first feed point A may further be disposed on the second conductive body 200, and the second feed point B may be further disposed on the first conductive body 100. Herein, under the condition that the existing processing technique allows, the first feed point A may be arranged at a position where a distance to the micro-slit structure 300 is the smallest and a distance to the conductive connection structure 400 is the greatest on the first conductive body 100. Similarly, the second feed point B may be arranged at a position where the distance to the micro-slit structure 300 is the smallest and the distance to the conductive connection structure 400 is the greatest on the second conductive body 200.

The first conductive body 100 may be connected to a NFC circuit module 500 via the first feed point A, and the second conductive body 200 may be connected to the NFC circuit module 500 via the second feed point B.

The first feed point A and the second feed point B are shared by the NFC circuit module 500 and a main signal circuit module 600. In such a case, the first conductive body 100 is further connected to the main signal circuit module 600 via the first feed point A, and the second conductive body 200 is further connected to the main signal circuit module 600 via the second feed point B. For example, the NFC circuit module 500 and the main signal circuit module 600 may be disposed on a predetermined carrier. As an example, the NFC circuit module 500 and the main signal circuit module 600 may be disposed on a main board of the electronic terminal.

Preferably, a low pass filter and a high pass filter may be disposed between the NFC circuit module 500 and the main signal circuit module 600, respectively, so as to separate two signals from each other and avoid mutual influence between the two signals.

For example, the NFC antenna structure according to the exemplary embodiment of the present application may further include a first low pass filter 101, a second low pass filter 102, a first high pass filter 201 and a second high pass filter 202. Preferably, as an example, the first low pass filter 101 and the second low pass filter 102 may be inductors having inductance (for example, 50 to 100 nH), and the first high pass filter 201 and the second high pass filter 202 may be capacitors having capacitance (for example, 30 to 100 pH). However, the present utility model is not limited thereto. Other types of low pass filters and high pass filters may further be adopted.

Specifically, one end of the first low pass filter 101 is connected to the first feed point A and the other end of the first low pass filter 101 is connected to the NFC circuit module 500, and one end of the second low pass filter 102 is connected to the second feed point B and the other end of the second low pass filter 102 is connected to the NFC circuit module 500. At this time, the NFC circuit module 500 may receive the NFC signal via the first conductive body 100→the first feed point A→the first low pass filter 101, and the NFC signal generated by the NFC circuit module 500 may be transmitted out via the second low pass filter 102→the second feed point B→the second conductive body 200→the conductive connection structure 400→the first conductive body 100. Herein, the NFC circuit module 500 may be a NFC chip disposed on the main board, so as to implement transmission and reception of the NFC signal.

One end of the first high pass filter 201 is connected to the first feed point A and the other end of the first high pass filter 201 is connected to the main signal circuit module 600, and one end of the second high pass filter 202 is connected to the second feed point B and the other end of the second high pass filter 202 is connected to the main signal circuit module 600. At this time, the main signal circuit module 600 may receive a main signal via the first conductive body 100→the first feed point A→the first high pass filter 201, and the main signal generated by the main signal circuit module 600 may be transmitted out via the second high pass filter 202→the second feed point B→the second conductive body 200→the conductive connection structure 400→the first conductive body 100. As an example, the main signal may include at least one of the following signals: GSM, CDMA, TD-S, WCDMA, LTE, GPS, and WIFI. Herein, the main signal circuit module 600 may be a chip corresponding to the above main signal, so as to implement transmission and reception of the main signal.

In one example, the first conductive body 100, the second conductive body 200, and the micro-slit structure 300 may constitute at least one portion of the housing of the electronic terminal. Preferably, the first conductive body 100, the second conductive body 200, the micro-slit structure 300 and the conductive connection structure 400 may constitute at least one portion of the housing. For example, the first conductive body 100, the micro-slit structure 300, the second conductive body 200 and the conductive connection structure 400 may form the housing of the electronic terminal, and the housing is, for example, a back housing (a rear cover) of the electronic terminal. As an example, the electronic terminal may be a device having a communication function such as a smart phone, a smart wearable device, a tablet computer, a notebook computer, an in-vehicle device, a network television, an electronic reader, a remote controller, and the like.

Another exemplary embodiment of the present application may provide an electronic terminal including the abovementioned housing.

The use of the NFC antenna structure, the housing with the same, and the electronic terminal in the exemplary embodiments of the present application does not need to dispose a separate NFC coil antenna, which not only saves a material cost, but also reduces the mounting procedure of the NFC coil antenna, avoids an error in the mounting process and facilitates controlling mass production indicators.

In addition, the use of the NFC antenna structure, the housing with the same, and the electronic terminal in the exemplary embodiments of the present application, and the direct use of the micro-slit structure on the metal housing of the electronic terminal to implement transmission of the NFC signal do not need to dispose a slit on the housing of the electronic terminal additionally, which improves appearance of the electronic terminal.

In addition, the use of the NFC antenna structure, the housing with the same, and the electronic terminal in the exemplary embodiments of the present application, and the isolation of the NFC signal from the main signal by further disposing an isolation circuit avoid the mutual coupling effect between the two signals effectively.

It should be understood that in the exemplary embodiments of the present application, an orientation or positional relation indicated by the terms "lateral direction", "longitudinal direction", "length", "width" and the like is the orientation or positional relation illustrated based on the drawings, which merely aims to facilitate describing the present application and simplifying the depiction, rather than implying or indicating that the referred device or element necessarily has a specific orientation and is configured and operated in the specific orientation, and thus may not be understood as a limitation for the present application.

Although the present application has been specifically illustrated and described with reference to the exemplary embodiments thereof, those skilled in the art should understand that various changes in forms and details may be made therein without departing from the spirit and the scope of the present application as defined by the claims.

The invention claimed is:

1. A near field communication (NFC) antenna structure comprising a first conductive body, a second conductive body, a conductive connection structure, a micro-slit structure, a first feed point, and a second feed point,
   wherein the conductive connection structure bridges the first conductive body and the second conductive body,
   wherein the micro-slit structure is positioned between the first conductive body and the second conductive body to separate the first conductive body from the second conductive body,
   wherein the first feed point is provided on the first conductive body,
   wherein the second feed point is provided on the second conductive body,
   wherein the micro-slit structure includes at least one conductive layer and at least one non-conductive layer, which are separate from the first conductive body and the second conductive body and arranged alternatively along a first direction from the first conductive body to the second conductive body or along a second direction from the second conductive body to the first conductive body,
   wherein the at least one conductive layer included in the micro-slit structure is connected to the conductive connection structure, and
   wherein a length of the conductive connection structure is greater than a thickness of the micro-slit structure in the first direction or the second direction.

2. The NFC antenna structure of claim 1, wherein the conductive connection structure bridges the first conductive body, the micro-slit structure, and the second conductive body in a direction of the first conductive body opposite to the second conductive body.

3. The NFC antenna structure of claim 2, wherein the first feed point is arranged at a position close to the micro-slit structure and far away from the conductive connection structure on the first conductive body, and the second feed point is arranged at a position close to the micro-slit structure and far away from the conductive connection structure on the second conductive body.

4. The NFC antenna structure of claim 1, wherein the first conductive body is connected to an NFC circuitry via the first feed point, and the second conductive body is connected to the NFC circuitry via the second feed point.

5. The NFC antenna structure of claim 4, wherein the first feed point and the second feed point are shared by the NFC circuitry and a main signal circuitry.

6. The NFC antenna structure of claim 5, wherein the NFC antenna structure further includes a first low pass filter and a second low pass filter,
   wherein one end of the first low pass filter is connected to the first feed point and the other end of the first low pass filter is connected to the NFC circuitry, and one end of the second low pass filter is connected to the second feed point and the other end of the second low pass filter is connected to the NFC circuitry.

7. The NFC antenna structure of claim 5, wherein the NFC antenna structure further includes a first high pass filter and a second high pass filter,
   wherein one end of the first high pass filter is connected to the first feed point and the other end of the first high pass filter is connected to the main signal circuitry, and one end of the second high pass filter is connected to the second feed point and the other end of the second high pass filter is connected to the main signal circuitry.

8. The NFC antenna structure of claim 5, wherein the first conductive body, the micro-slit structure, and the second conductive body form a housing of an electronic terminal.

9. The NFC antenna structure of claim 8, wherein the NFC circuitry and the main signal circuitry are provided on a main board of the electronic terminal.

10. An electronic terminal comprising:
   a near field communication (NFC) antenna structure; and
   a processing circuitry coupled to the NFC antenna structure,
   wherein the NFC antenna structure comprises a first conductive body, a second conductive body, a conductive connection structure, a micro-slit structure, a first feed point and a second feed point,
   wherein the conductive connection structure bridges the first conductive body and the second conductive body,
   wherein the micro-slit structure is positioned between the first conductive body and the second conductive body to separate the first conductive body from the second conductive body, the first feed point is provided on the first conductive body, and the second feed point is provided on the second conductive body,
   wherein the micro-slit structure includes at least one conductive layer and at least one non-conductive layer, which are separate from the first conductive body and the second conductive body and arranged alternatively along a first direction from the first conductive body to the second conductive body or along a second direction from the second conductive body to the first conductive body, wherein the at least one conductive layer included in the micro-slit structure is connected to the conductive connection structure, and wherein length of the conductive connection structure is greater than thickness of the micro-slit structure in the first direction or the second direction.

11. The electronic terminal of claim 10, wherein the conductive connection structure bridges the first conductive body, the micro-slit structure, and the second conductive body in a direction of the first conductive body opposite to the second conductive body.

12. The electronic terminal of claim 11, wherein the first feed point is arranged at a position close to the micro-slit structure and far away from the conductive connection structure on the first conductive body, and the second feed point is arranged at a position close to the micro-slit structure and far away from the conductive connection structure on the second conductive body.

13. The electronic terminal of claim 10, wherein the first conductive body is connected to an NFC circuitry of the processing circuitry via the first feed point, and the second conductive body is connected to the NFC circuitry via the second feed point.

14. The electronic terminal of claim 13, wherein the first feed point and the second feed point are shared by the NFC circuitry and a main signal circuitry of the processing circuitry.

15. The electronic terminal of claim 14, wherein the NFC antenna structure further includes a first low pass filter and a second low pass filter, wherein one end of the first low pass filter is connected to the first feed point and the other end of the first low pass filter is connected to the NFC circuitry, and one end of the second low pass filter is connected to the second feed point and the other end of the second low pass filter is connected to the NFC circuitry.

16. The electronic terminal of claim 14, wherein the NFC antenna structure further includes a first high pass filter and a second high pass filter, wherein one end of the first high pass filter is connected to the first feed point and the other end of the first high pass filter is connected to the main signal circuitry, and one end of the second high pass filter is connected to the second feed point and the other end of the second high pass filter is connected to the main signal circuitry.

17. The electronic terminal of claim 14, wherein the first conductive body, the micro-slit structure, and the second conductive body form a housing of the electronic terminal.

18. The electronic terminal of claim 17, wherein the NFC circuitry and the main signal circuitry are provided on a main board of the electronic terminal.

* * * * *